US005347713A

United States Patent [19]

Shibata et al.

[11] Patent Number: 5,347,713

[45] Date of Patent: Sep. 20, 1994

[54] METHOD FOR MANUFACTURING INK JET HEAD

[75] Inventors: Makoto Shibata; Yukio Kawajiri, both of Yokohama; Shuji Koyama, Kawasaki; Manabu Sueoka, Yokohama; Toshio Suzuki, Inagi; Hisashi Yamamoto, Machida; Takumi Suzuki, Yokohama, all of Japan

[73] Assignee: Canon Kabushiki Kaisha, Tokyo, Japan

[21] Appl. No.: 964,298

[22] Filed: Oct. 21, 1992

[30] Foreign Application Priority Data

Oct. 22, 1991 [JP] Japan .................................. 3-274207

[51] Int. Cl.5 .............................................. B23P 15/00

[52] U.S. Cl. ................................. 29/890.1; 346/140.1

[58] Field of Search ..................... 29/25.35, 890.1, 611; 346/76 PH, 11.1

[56] References Cited

U.S. PATENT DOCUMENTS

| | | | |
|---|---|---|---|
| 4,047,186 | 9/1977 | Kendall et al. | 29/890.1 |
| 4,313,124 | 1/1982 | Hara | 346/140 R |
| 4,345,262 | 8/1982 | Shirato et al. | 346/140 R |
| 4,417,251 | 11/1983 | Sugitani | 346/1.1 |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,657,631 | 4/1987 | Noguchi | 156/655 |
| 4,680,859 | 7/1987 | Johnson | 29/611 |
| 4,685,185 | 8/1987 | Boso et al. | 29/890.1 |
| 4,723,129 | 2/1988 | Endo et al. | 346/1.1 |
| 4,725,851 | 2/1988 | Sutera | 346/75 |
| 4,740,796 | 4/1988 | Endo et al. | 346/1.1 |
| 5,057,853 | 10/1991 | Fisher | 346/1.1 |
| 5,072,240 | 12/1991 | Miyazawa et al. | 29/25.35 |

FOREIGN PATENT DOCUMENTS

| | | | |
|---|---|---|---|
| 0370776 | 5/1990 | European Pat. Off. . | |
| 54-056847 | 5/1979 | Japan . | |
| 0160653 | 10/1982 | Japan | 29/890.1 |
| 0051162 | 3/1983 | Japan | 29/890.1 |
| 0224760 | 12/1983 | Japan | 29/890.1 |
| 59-123670 | 7/1984 | Japan . | |
| 59-138461 | 8/1984 | Japan . | |
| 60-071260 | 4/1985 | Japan . | |
| 60-166463 | 8/1985 | Japan . | |
| 60-171165 | 9/1985 | Japan . | |
| 3251244 | 10/1988 | Japan | 29/890.1 |
| 3007349 | 1/1991 | Japan . | |

*Primary Examiner*—Irene Cuda

*Attorney, Agent, or Firm*—Fitzpatrick, Cella, Harper & Scinto

[57] ABSTRACT

A method for manufacturing an ink jet head having a discharge opening for discharging ink and an ink passage communicated with the discharge opening, includes the step of forming the discharge opening by performing a cutting operation along a portion where the discharge opening is to be formed, while maintaining the ink passage in a pressurized condition by filling the ink passage with fluid. Another method includes the step of cleaning an ink passage by introducing liquid and gas into the ink passage alternately; and an ink jet apparatus comprising such an ink jet head, and a member for holding the ink jet head.

34 Claims, 7 Drawing Sheets

METHOD FOR MANUFACTURING INK JET HEAD

BACKGROUND OF THE INVENTION

1. Field of the Invention

The present invention relates to a method for manufacturing an ink jet recording head for performing recording by discharging ink. The present invention also relates to an ink jet recording head manufactured by such a method. Further, the present invention relates to an ink jet recording apparatus on which such an ink jet recording head can be mounted.

2. Related Background Art

As an example of ink jet recording heads, there is an ink jet recording head in which ink passages communicating with corresponding discharge openings are formed in a substrate. Normally, energy generating means for generating energy employed to discharge ink are disposed on a surface of the substrate in correspondence with the ink passages. Further, generally, a common liquid chamber communicating with the ink passages is provided to reserve the ink therein. In this specification, the ink passages and the common liquid chamber are referred to as "ink passages" generally. The energy generating means may be an electro-thermal conversion element or piezo-electric element which is one part of the thermal energy generating means. The substrate may, for example, be a silicon wafer.

Conventionally, methods for manufacturing such an ink jet recording head are generally divided into two groups. In the first group of methods, a negative type photosensitive resin layer is laminated on a substrate on which energy generating means are disposed, and a portion of the photosensitive resin layer corresponding to walls of a common liquid chamber and ink passages is exposed and then is developed. As a result, the resin corresponding to the partition walls between the ink passages and the like remains, but the resin corresponding to the ink passages and the common liquid chamber is removed. Thereafter, for example, a top plate or lid plate having an ink supply port in correspondence with the common liquid chamber is arranged on the partition walls. Finally, the assembly (substrate, lid plate and the like) is cut by a cutting blade while pouring a cutting liquid along a portion where discharge openings are to be formed, thereby forming a discharge opening surface (surface in which discharge opening are formed). The cutting blade may be a cutting blade used to cut the silicon wafer in a semi-conductor manufacturing process.

In the second group of methods, a positive type photosensitive resin layer is laminated on a substrate on which energy generating means are disposed, and a portion of the photosensitive resin layer corresponding to walls of a common liquid chamber and ink passages is exposed and then is developed. As a result, the resin corresponding to the partition walls between the ink passages and the like is removed, but the resin corresponding to the ink passages and the common liquid chamber remains. Thereafter, another resin is poured to cover the remaining resin and then is cured. After curing, the resin and the substrate are cut along a portion where discharge openings are to be formed, thereby forming a discharge opening surface, and by removing the remaining resin, the discharge openings and the ink passages are formed.

When manufacturing an ink jet recording head by the above-mentioned methods, since swarf often enters into the ink passages and/or the remaining resin is not removed completely by the resin removing process, so that some partly remains in the ink passages, the ink passages must be sometimes cleaned. The cleaning operation is normally performed by introducing a washing liquid into the ink passages from the ink supply port. The washing liquid may be organic solvent such as acetone, isopropyl alcohol or the like, alkali solition such as sodium hydroxide solution, detergent solution, or pure water including carbon dioxide bubbles therein.

The above-mentioned conventional ink jet recording head manufacturing methods have the following drawbacks:

(1) In the first group of methods, since the ink passages have already been opened, when the discharge openings are opened by the cutting operation, the cutting liquid including the swarf enters into the ink passages so that the swarf may sometimes accumulated on and adhere to the ink passage walls, the common liquid chamber walls and/or the surfaces of the energy generating means. Although such deposits should have naturally been removed by the cleaning process, it is not always removed completely. Further, once the ink passages are dried to solidify the remaining deposit, it is further difficult to remove the remaining deposit. If the deposits remain on the ink passages and the like, it is feared that the deposits will separate from the walls thereby to clog the discharge openings during the use of ink jet recording head. If the deposits adhere to the surface of the energy generating means, the unstable or poor ink discharge will occur.

(2) In the second group of methods, even when the cleaning process is performed, it is difficult to prevent the resin remnants which are to be removed from remaining on the walls of the ink passages (particularly, in the corners of the passages). If the resin remnants remain on the ink passages and the like, it is feared that the remnants will separate from the walls thereby to clog the discharge openings during use of the ink jet recording head. Incidentally, the reason why it is difficult to completely clean the ink passages is considered that the ink passages and the discharge openings are very small so as to have high hydrodynamic resistance and thus the flowing speed of the washing liquid cannot be great.

SUMMARY OF THE INVENTION

A main object of the present invention is to provide an ink jet recording head manufacturing method for manufacturing an ink jet recording head, which can prevent swarf from entering into ink passages, can effectively remove foreign matter in the ink passages to prevent the clogging of discharge openings, and can provided an ink jet recording head having high reliability and high quality.

According to a preferred aspect of the present invention, in an ink jet recording head manufacturing method, ink passages and a liquid chamber to be disposed at a side of ink supply openings of the ink passages are formed on a substrate, the liquid chamber is supplied with pressurized fluid to establish the pressurized condition in the liquid chamber and the substrate is cut along a portion where discharge openings are to be formed while maintaining the liquid chamber to the pressurized condition, thereby forming the discharge openings and obtaining a discharge element.

According to another aspect of the present invention, in an ink jet recording head manufacturing method, after the discharge element is formed, the interior or the discharge element is cleaned by introducing liquid overlapped by a sound wave into the discharge element from an ink supply port.

According to a further aspect of the present invention, in an ink jet recording head manufacturing method, after the discharge element is formed, the interior of the discharge element is cleaned by introducing liquid and air into the discharge element alternately from an ink supply port.

In the ink jet recording head manufacturing method according to the aforementioned preferred aspect of the present invention, since the liquid chamber is maintained in the pressurized condition by the pressurized fluid while the cutting operation for forming the discharge openings is being effected, even when the discharge openings are opened by the cutting operation, it is possible to prevent the cutting liquid including the swarf from entering into the ink passages from the discharge openings.

The pressurized condition in the liquid chamber is desirable to be an extent that the fluid in the liquid chamber can be blown out from the discharge openings when the discharge openings are opened, and further, it is desirable to continue to supply the fluid from the ink supply port in order to maintain the liquid chamber in the pressurized condition after the liquid has been blown out from the discharge openings. In order to supply the fluid from the ink supply port while maintaining the liquid chamber to the pressurized condition, a nozzle may be arranged to be spaced away from or contiguous to the ink supply port and the pressurized fluid is injected from the nozzle. More preferably, liquid including abrasives is used as the pressurized fluid to be supplied from the ink supply port, so that the liquid including the abrasives is blown out from the discharge openings when the discharge openings are opened, thereby polishing the discharge opening forming surface by the abrasives.

In the ink jet recording head manufacturing method according to the aforementioned another aspect of the present invention, since after the discharge element is formed the interior of the discharge element is cleaned by introducing the liquid overlapped by the sound wave from the ink supply port, the flowing speed of the liquid becomes substantially faster due to the overlapping of the sound wave, thus effectively cleaning the discharge element.

In the ink jet recording head manufacturing method according to the aforementioned further aspect of the present invention, since after the discharge element is formed the interior of the discharge element is cleaned by introducing the gas and the liquid alternately, the gas having extremely small viscous resistance is included in the fluid, which substantially increases the flowing speed of the liquid and accordingly the washing liquid, thus effectively cleaning the discharge element. In this case, since the gas does not directly contribute to the washing, the usual gas such as nitrogen, oxygen, air or argon can be used.

In the above-mentioned aspects of the present invention, the washing liquid is not limited to any particular ones, but any washing liquid usually used in washing processes can be used. As mentioned above, such washing liquid may be, for example, pure water, detergent solution, alkali solution, acetone or the like. However, in order to prevent the solidification of component(s) of the washing liquid in the discharge element, the liquid used in the washing operation is desirable to be replaced by the pure water at the final stage of the washing process. Further, after the washing operation, it is desirable that the interior of the discharge element be dried by introducing gas into the discharge element. During the washing operation, in order to enhance the washing effect, vacuum suction may be effected regarding the interior of the discharge element via the discharge openings.

Incidentally, when the ink jet recording head manufacturing methods according to the above-mentioned aspects of the present invention are combined, the effect of the present invention will be multiplied.

DETAILED DESCRIPTION OF THE PREFERRED EMBODIMENTS

The present invention will now be explained in connection with embodiments thereof with reference to the accompanying drawings. First of all, a discharge element 10 of an ink jet recording head manufactured by an ink jet recording head manufacturing method according to the present invention will be described referring to FIG. 1.

Figure 1:
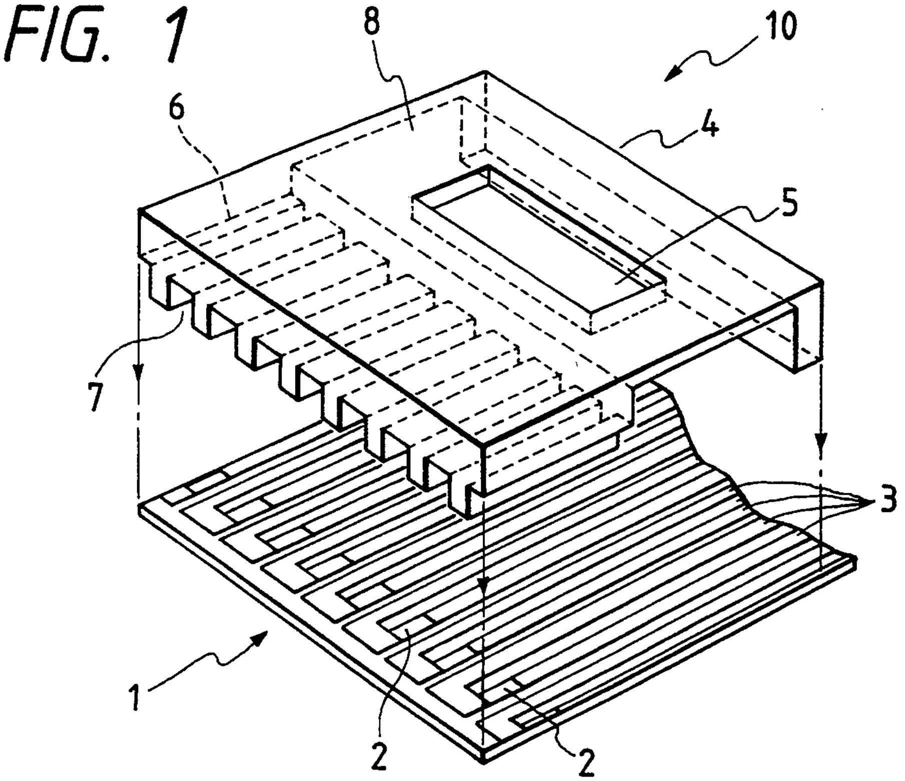
FIG. 1 is a schematic partial sectional perspective view of a discharge element which is a main part of an ink jet recording head manufactured by an ink jet recording head manufacturing method according to the present invention.

FIG. 1 is a schematic partial sectional exploded perspective view of a discharge element 10 which is used in and is a main part of an ink jet recording head of a type wherein ink is discharged by employing thermal energy.

The discharge element 10 mainly comprises a plurality of small or minute discharge openings 7 for discharging ink, ink passages 6 associated with and communicated with the respective discharge openings 7, a common liquid chamber 8 communicated with the ink passages 6 in common to supply ink to the latter, an ink supply port 5 formed in a ceiling of the liquid chamber 8 and adapted to supply the ink to the liquid chamber 8, and a substrate 1 on which heat generating portions 2 of electro-thermal conversion elements for generating thermal energy employed to discharge the ink are disposed in correspondence with the ink passages 6. Electrodes 3 for energizing the corresponding heat generating portions 2 of the electro-thermal conversion elements are also disposed on the substrate 1. In this specification, a heat generating resistance layer including the heat generating portion for generating thermal energy and the electrode connected thereto are referred to as an "electro-thermal conversion element" generally.

In the discharge element 10, the ink passages 6, discharge openings 7, ink supply port 5 and liquid chamber 8 are integrally formed in a structure member 4, and the structure member 4 is bonded to the surface of the substrate 1 on which the heat generating portions 2 of the electro-thermal conversion elements are disposed. In place of the structure member 4, partition walls isolating the adjacent ink passages and walls of the liquid chamber 8 may first be formed on the substrate 1, and then a top plate or lid plate having the ink supply port 5 formed therein may be bonded to the substrate.

Generally, since the ink passages 6 and the discharge openings 7 are very small, they are formed by photolithography techniques. In this case, it is practical to form longer ink passages 6 and then to simultaneously cut the substrate 1 and the structure member 4 along a portion where the discharge openings 7 are to be formed, thus forming a discharge opening forming surface on which the discharge openings 7 are formed. Alternatively, a substrate including two discharge element blanks opposed to each other may be prepared, and a member including two structure member blanks may be bonded to the substrate, and then a cutting operation for forming the discharge openings may be effected, thereby obtaining two discharge elements 10 simultaneously (simultaneous formation of two discharge elements). As described in connection with the prior art, upon opening of the discharge openings, there are two cases, one in which the ink passages 6 are filled with the removable resin (photosensitive resin and the like) and the other in which the ink passages have already been opened.

The discharge element 10 is assembled as an ink jet recording head by connecting an ink supply tube (not shown) communicating with an ink tank (not shown) to the ink supply port 5 and by electrically connecting wires for conveying recording signals to the electrodes 3. By selectively energizing the heat generating portions 2 of the electro-thermal conversion elements, the ink near the heat generating portion of the electro-thermal conversion element is heated to generate a bubble, with the result that the ink is discharged from the discharge opening 7. Incidentally, in place of the electro-thermal conversion element, a piezo-electric element for generating mechanical energy for discharging ink may be used as the energy generating means for generating the energy employed to discharge ink. Further, 128 or 256 discharge openings 7 can be obtained with a high density arrangement. In addition, an ink jet recording head of full line type can be obtained by arranging the discharge openings along the whole width of a recordable area of a recording medium.

Figure 2:
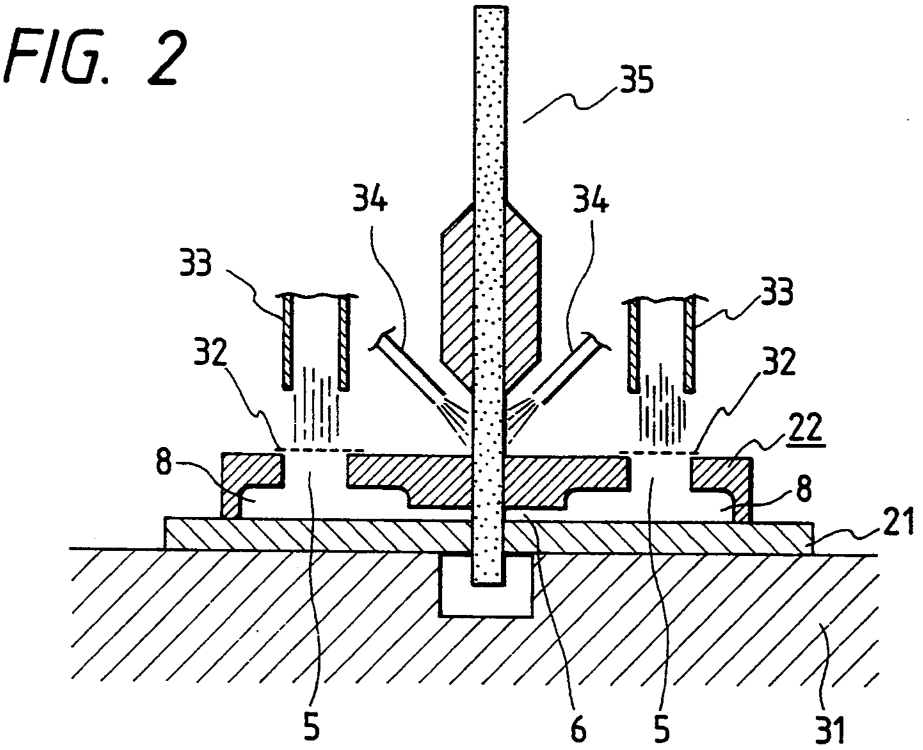
FIG. 2 is a schematic sectional view for explaining an ink jet recording head manufacturing method according to a first embodiment of the present invention.

Now, an ink jet recording head manufacturing method according to a first embodiment of the present invention will be explained with reference to FIG. 2 schematically showing a sectional view. In this embodiment, when two discharge elements are simultaneously formed, a cutting operation for forming the discharge openings is effected while maintaining the ink passages in a pressurized condition.

In this embodiment, a substrate 21 including two discharge element blanks opposed to each other and having a common portion where the discharge openings are to be formed is prepared, and a structure member 22 including two structure member blanks corresponding to the discharge element blanks is bonded to the substrate, and then the bonded assembly is cut along the aforementioned portion, thereby obtaining two discharge elements simultaneously. The ink supply port 5, ink passages 6 and liquid chamber 8 were formed in each discharge element in the same manner as mentioned above.

Incidentally, the ink passages 6 are formed directly from one of the liquid chambers 8 to the other liquid chamber 8, and by cutting the ink passages 6 at their intermediate points, the discharge openings are formed. Further, energy generating elements (not shown) are arranged on the substrate 21 in correspondence with the ink passages 6, and two of these energy generating elements are associated with each ink passage extending from one of the liquid chambers 8 to the other. When the substrate is cut to form the discharge openings, one of these two energy generating elements is included in one of the discharge elements, and the other energy generating element is included in the other discharge element.

First of all, in order to prevent foreign matter from entering into the liquid chambers 8, each ink supply port 5 is covered by a net-shaped filter 32, and a back or lower surface of the substrate 21 to which the structure member 22 is bonded is chucked on a table 31 of a cutting device by vacuum. Then, pure water including carbon dioxide bubbles is injected toward the ink supply ports 5 from nozzles 33 disposed above the ink supply ports 5. As a result, the liquid chambers 8 are filled with the pure water including carbon dioxide bubbles and are maintained in a pressurized condition by the action of the injection of the pure water.

A cutting blade 35 is rotated at a high speed (for example, 10000–30000 rpm) while a cutting liquid 34 is poured from nozzles 34 at an area where the structure member 22 or the substrate 21 is being cut by the blade 35, and the table 31 is reciprocally shifted in a direction perpendicular to a plane of FIG. 2, thereby performing the cutting operation. As the cutting operation progresses, the discharge opening forming surfaces are gradually formed and the discharge openings are opened. In this case, since the liquid chambers 8 are maintained in the pressurized condition by the pure water including the bubbles therein, when the discharge openings are opened, the pure water is blown out from the discharge openings. Accordingly, the cutting liquid is prevented from entering into the ink passages 6 from the discharge openings, thereby obtaining the discharge elements with high quality.

Since it is not desirable that the positions of the nozzles 33 be deviated from the corresponding ink supply ports 5 as the table 31 is shifted, the nozzles 33 are attached to the table 31, and the pure water is preferably injected from the nozzles 33 in a strip pattern. The reason why the pure water including the carbon dioxide bubbles injected from the nozzles 33 is used is to prevent the charging of the workpiece when the pure water is injected at a high speed. When the energy generating elements have already been disposed on the substrate, if the workpiece is electrically charged, the dielectric breakdown of the energy generating elements will occur and anti-cavitation protection layers (for example, tantalum layers) on the energy generating elements will be oxidized by the charged water. In order to avoid this, the pure water including the carbon dioxide bubbles is used to prevent the charging of the workpiece. Further, since it is feared that electrostatic charges might be generated by the high speed rotation of the cutting blade 35 to cause the dielectric breakdown in the discharge elements, it is desirable that the cutting liquid be made conductive.

In the above-mentioned first embodiment, while the pure water including the carbon dioxide bubbles therein was used as liquid injected from the nozzles 33, it is possible to prevent the swarf from entering into the ink passages 6 by using detergent solution or gas such as air or nitrogen in place of the pure water, thus obtaining the discharge elements with high quality.

Next, a second embodiment of the present invention will be explained. In this second embodiment, in place of the pure water including the carbon dioxide bubbles in the above-mentioned first embodiment, pure water including abrasive particles is injected from the nozzles. As a result, when the cutting operation which is the same as in the first embodiment is effected with the pure water including the abrasive particles, it was found that the discharge opening forming surface of each discharge element was substantially mirror-finished and chipping and cracks around the discharge openings were greatly reduced. In this embodiment, the abrasives are smoothly moved, thus providing the excellent effect.

Incidentally, the abrasives may be of any types usually used as abrasives or polishing agents such as $Al_2O_3$ group abrasives, SiC group abrasives, $ZrO_2$ group abrasives, $CeO_2$ group abrasives or diamond abrasives, and in order to enhance the effect, an average diameter of abrasive particles may be 0.05–5 $\mu$m. Incidentally, after the cutting operation, in order to remove the abrasives remaining in the discharge element, pure water or the like must be introduced into the discharge element.

Figure 3:
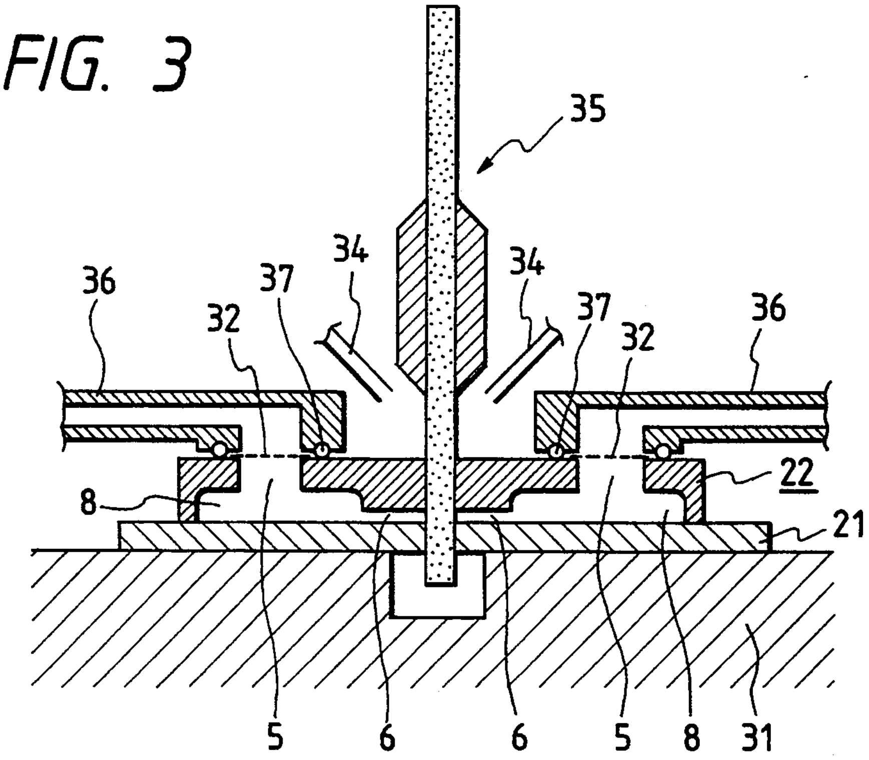
FIG. 3 is a schematic sectional view for explaining an ink jet recording head manufacturing method according to a third embodiment of the present invention.

Next, a third embodiment of the present invention will be explained. While the nozzles 33 were spaced apart from the ink supply ports 5 in the first embodiment, as shown in FIG. 3 illustrating a sectional view, nozzles may be directly connected to the corresponding ink supply ports 5.

In this third embodiment, in place of the nozzles 33 in the first embodiment, supply tubes 36 are used, which supply tubes are abutted against corresponding ink supply ports 5 via O-rings 37. Similar to the nozzles 33 in the first embodiment, the supply tubes 36 serve to supply pressurized fluid (pure water including carbon dioxide bubbles, detergent solution, air, nitrogen or the like) to the liquid chambers 8 in maintain the liquid chambers to the pressurized state. The O-rings 37 serve to reduce leakage of the pressurized fluid and to prevent damage of the tubes and the structure member 22 due to the direct contact between them. Incidentally, even if a small amount of the pressurized fluid escapes. through the O-rings, there is no problem. The supply tubes 36 are fixed to the table 31 to move together with the table 31 during the cutting operation.

With this arrangement, in comparison with the first embodiment, it is possible to further increase the pressurizing force in the liquid chambers 8, thus preventing the cutting liquid from entering into the ink passages 6 more effectively. Further, similar to the second embodiment, pure water including abrasive particles may be supplied from the supply tubes 36 to the liquid chambers 8. In addition, liquid and gas may be alternately introduced into the liquid chambers 8.

In the aforementioned first to third embodiments, while in the example given two discharge elements were formed simultaneously by cutting the substrate including two discharge element blanks, the present invention is not limited to this example. For example, in place of the substrate including two discharge element blanks opposed to each other, three or more discharge element blanks may be included in a wafer substrate.

Figure 4:
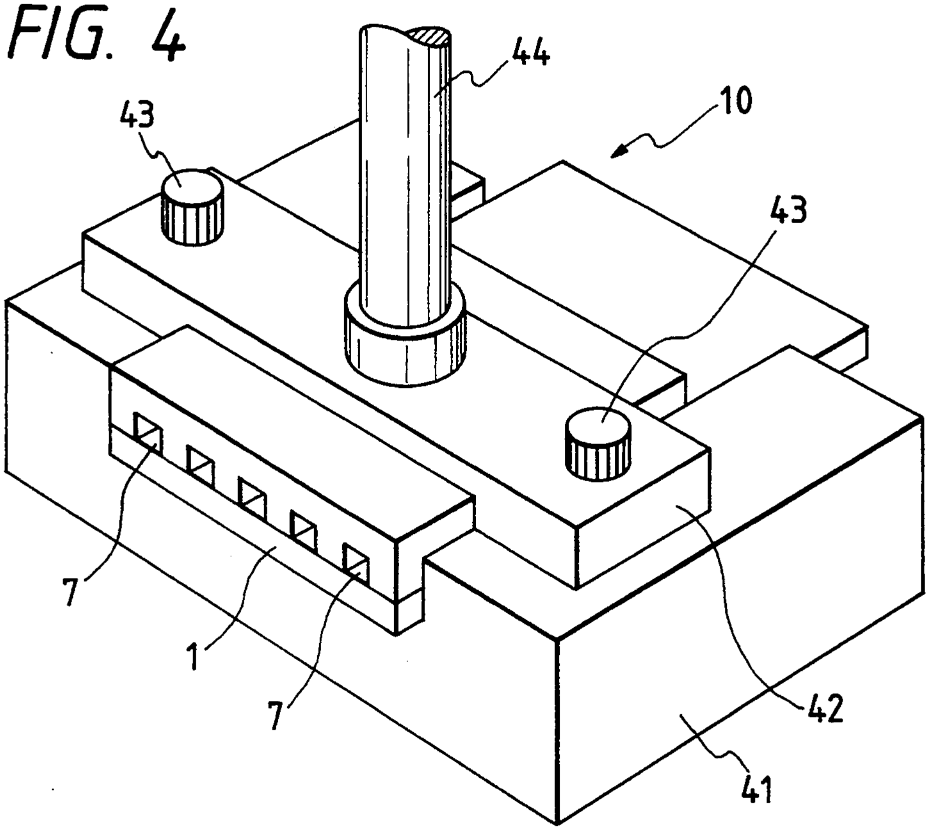
FIG. 4 is a schematic perspective view showing a relation between a discharge element and tools in an ink jet recording head manufacturing method according to a fourth embodiment of the present invention.
Figure 5:
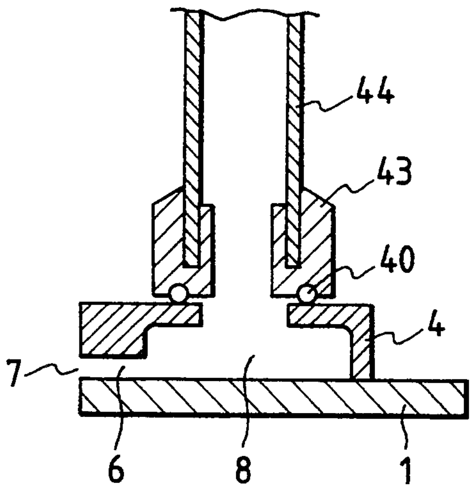
FIG. 5 is a schematic sectional view showing a relation between the discharge element and a washing liquid supply tube in the fourth embodiment.

Next, an ink jet recording head manufacturing method according to a fourth embodiment of the present invention will be explained. In this embodiment, the discharge element is cleaned by introducing washing liquid overlapped by a sound wave into the discharge element from the ink supply port. FIG. 4 is a schematic perspective view showing a relation between the discharge element 10 according to the fourth embodiment and tools, FIG. 5 is a schematic sectional view showing a relation between the discharge element 10 and a washing liquid supply tube 44, and FIG. 6 is a piping circuit.

Now, a washing system in the fourth embodiment will be explained. First of all, a method for securing the discharge element 10 will be described with reference to FIGS. 4 and 5. The discharge element 10 is the same as that shown in FIG. 1 (however, in FIG. 4, only five discharge openings 7 are shown for the clarification's sake) and is fitted into and held by a recessed portion of a holding tool 41 and is pressed by a fixing tool 42 from above, thus being secured between the tools 41, 42. The fixing tool 42 is removably fixed to the holding tool 41 by set screws 43. Further, one end of the washing liquid supply tube 44 is connected to the fixing tool 42 so that liquid from the washing liquid supply tube 44 can flow through the fixing tool 42 and enter into the interior of the discharge element 10 from the ink supply port 5. Incidentally, in order to prevent the leakage of fluid from the washing liquid supply tube 44, an O-ring 40 is arranged between the fixing tool 42 and the discharge element 10 to encircle the ink supply port 5.

Figure 6:
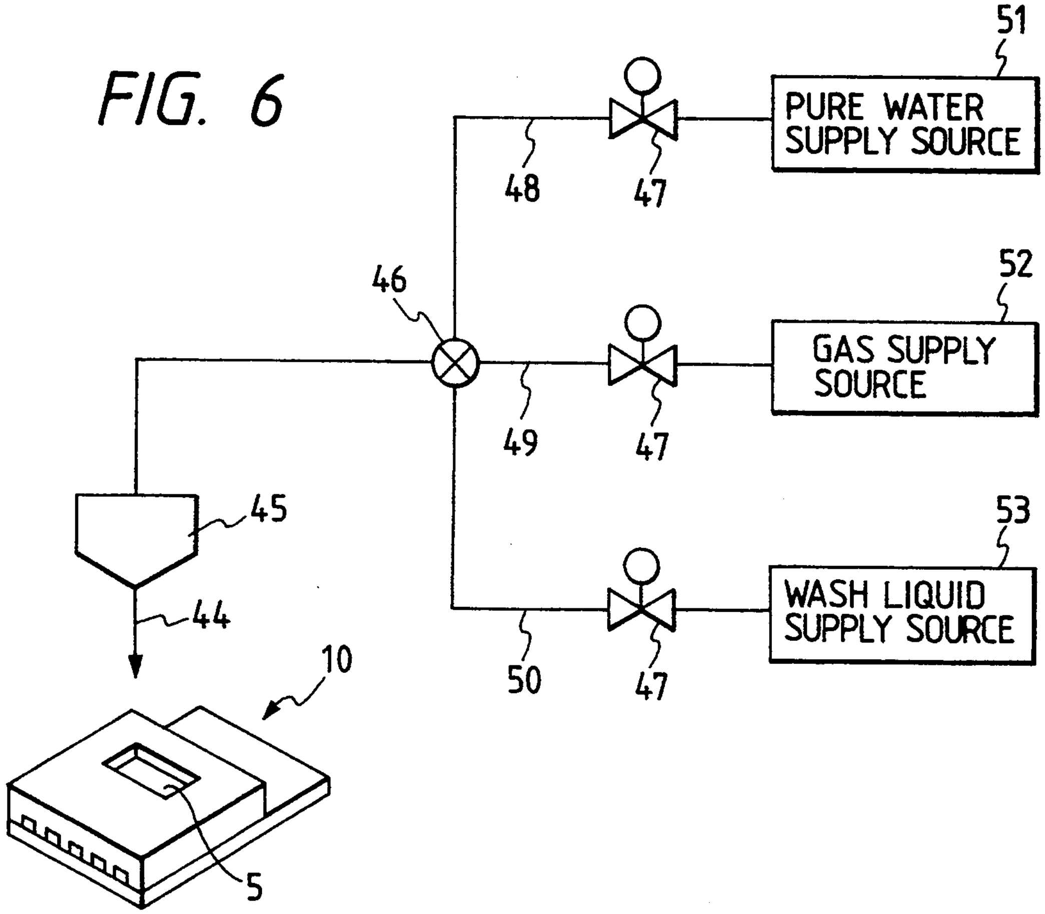
FIG. 6 is a piping circuit according to the fourth embodiment of the present invention.

As shown in FIG. 6, the other end of the washing liquid supply tube 44 is connected to a change valve 46 via a sound wave generator 45 for overlapping a sound wave to the liquid flowing into the washing liquid supply tube 44. Further, the change valve 46 is connected to a supply line 48 communicating with a pure water supply source 51 for supplying pure water, a supply line 49 communicating with a gas supply source 52 for supplying gas and a supply line 50 communicating with a washing liquid supply source 53 for supplying washing liquid. The change valve 46 serves to selectively connect one of these lines 48–50 to the washing liquid supply tube 44. Pressure regulators 47 are interposed in the supply lines 48–50, respectively.

Next, the cleaning of the discharge element 10 by using the washing system will be explained.

After the discharge element 10 is secured between the holding tool 41 and the fixing tool 42, the change valve 46 is changed to communicate with the supply line 50 for the washing liquid supply source, so that the washing liquid is introduced into the discharge element 10 from the ink supply port 5 via the washing liquid supply tube 44 while regulating the pressure of the washing liquid by the pressure regulator 47. In this case, the sound wave generator 45 is activated to overlap the sound wave to the washing liquid. The washing liquid introduced from the ink supply port 5 into the discharge element 10 passes through the liquid chamber 8 and the ink passages 6 and is blown out from the discharge element 10 via the discharge openings 7.

After the washing liquid overlapped by the sound wave by means of the sound wave generator 45 is flown in the discharge element 10, the change valve 46 is switched so that the pure water from the supply line 48 communicating with the pure water supply source is introduced into the discharge element 10 via the washing liquid supply tube 44. The pure water is introduced to remove the washing liquid from the discharge element 10. The pure water is also controlled by the pressure regulator 47 to regulate the pressure thereof and is overlapped by the sound wave.

After the discharge element 10 is cleaned by the pure water, the sound wave generator 45 is stopped, and then the change valve 46 is switched to introduce the gas from the gas supply source 52 into the discharge element 10, so that the interior of the discharge element 10 is dried. The pressure of the gas is also controlled by the pressure regulator 47. After, the drying operation by the gas is finished, all of the supply sources 51 to 53 are stopped. The fixing tool 42 is detached from the holding tool 41, and the discharge element 10 is removed.

The washing liquid may be neutral detergent solution, and alkali solution or acetone may be used to remove the remnents of positive photoresist. Alternatively, the washing liquid supply source 50, 53 may be omitted and the discharge element may be washed or cleaned only by pure water. The drying gas may be air, oxygen, nitrogen, argon or the like.

Now, the test result regarding this embodiment will be described. When FINEJET (trade name) manufactured by PRETEC Company was used as a sound wave generating device (not shown) connected to the sound wave generator 45, and the convey frequency was 1.8 MHz and the variable burst wave of 40 Hz to 10 kHz was added thereto, or when PULSEJET manufactured by HONDA DENSI Company was used as the sound wave generating device, and the convey frequency was 1.3 MHz and the variable burst wave of 40 Hz to 10 kHz was added thereto, it was found that even a smudge or stain which could not be substantially removed by the normal pressurizing washing operation in the discharge element could be removed substantially completely.

Next, a fifth embodiment of the present invention will be explained. When the washing operation in the fourth embodiment is effected regarding a number of discharge elements 10 at a time, it is feared that the pressures applied to the respective discharge elements 10 differ from each other due to the difference in lengths of the pipings to the respective discharge elements, with the result that the cleaning effects for the respective discharge elements differ from each other. Thus, in the fifth embodiment, the dispersion in the cleaning effects is eliminated by performing vacuum suction from the discharge openings 7.

Figure 7:
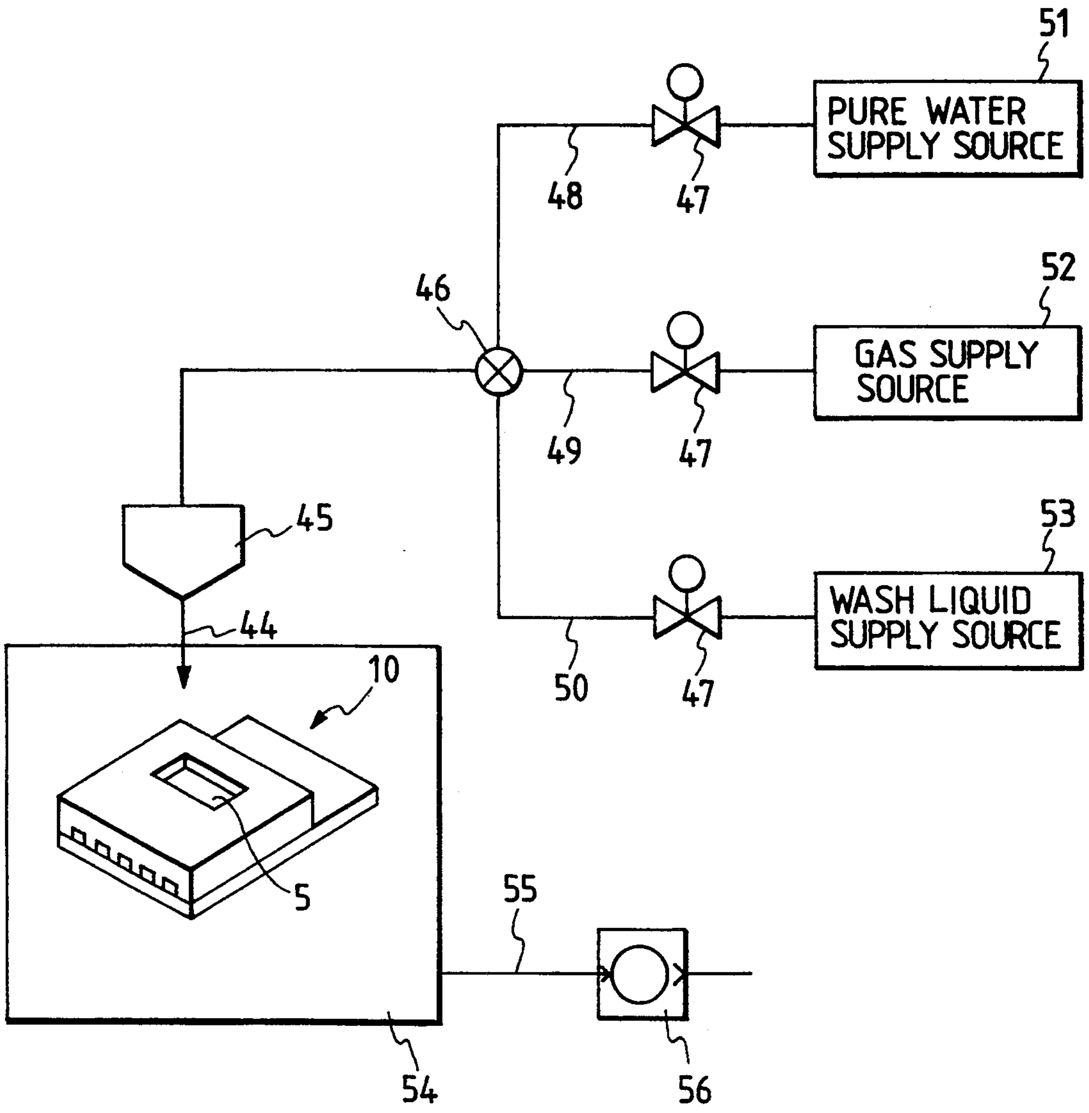
FIG. 7 is a piping circuit according to a fifth embodiment of the present invention.

FIG. 7 shows a piping circuit according to the fifth embodiment. This fifth embodiment differs from the fourth embodiment in that the discharge element 10 as well as the holding tool 41 (FIG. 4) and the fixing tool 42 (FIGS. 4 and 5) are housed in a vacuum chamber 54. The vacuum chamber 54 is connected to a vacuum pump 56 via a exhaust tube 55 so that the vacuum in the chamber can be maintained by the vacuum pump.

As explained in connection with the fourth embodiment, since the fixing tool 42 is abutted against the ink supply port 5 of the discharge element 10 via the O-ring 40, even when the air in the vacuum chamber 54 is exhausted or sucked by the vacuum pump, the washing liquid, pure water and gas are not leaked from the interface between the fixing tool 42 and the ink supply port 5. Further, since the opening portions of the discharge element 10 are only the discharge openings 7 except for the ink supply port 5, the vacuum suction is effected from the discharge openings 7 after all. When the pressures in the supply lines 48–50 were regulated to 1–2 $kg/cm^2$ by the respective pressure regulators 47 and the vacuum was established in the vacuum chamber 54 (the other conditions were the same as those in the fourth embodiment), even if a large number of discharge elements were cleaned simultaneously, it was found that there was no variations in the cleaning effects of the discharge elements 10.

Figure 8:
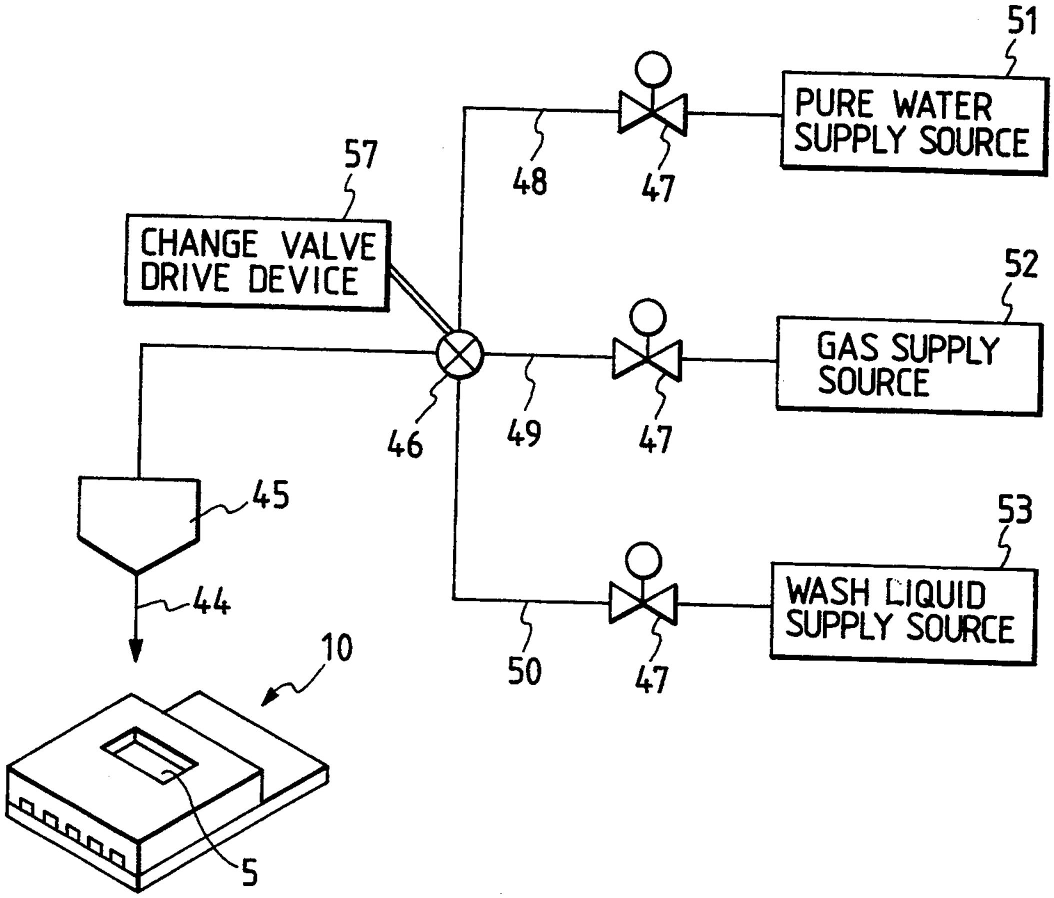
FIG. 8 is a piping circuit according to a sixth embodiment of the present invention.

Next, a sixth embodiment of the present invention will be explained. In this sixth embodiment, gas and liquid are introduced into the discharge element alternately to clean the interior of the discharge element. FIG. 8 shows a piping circuit of the cleaning system in the sixth embodiment. The cleaning system in this embodiment is fundamentally similar to that of the fourth embodiment, but differs from the fourth embodiment in that the sound wave generator is omitted from the washing liquid supply tube 44 and a change valve drive device 57 is provided for driving the change valve 46 at a high speed.

Now, the cleaning operation for the discharge element 10 by using this cleaning system will be described. After the discharge element 10 is fixed between the holding tool 41 and the fixing tool 42, the change valve drive device 57 is activated so that the change valve 46 can select the supply line 50 for the washing liquid supply source and the supply line 49 for the gas supply source alternately at a predetermined time interval. The pressures in the supply lines 49, 50 are previously adjusted by the pressure regulators 47 so that the back flow of the fluid due to the switching of the change valve is prevented.

With this arrangement, the washing liquid and the gas alternately flow through the discharge element 10 to clean the interior of the discharge element. The washing liquid and gas are discharged from the discharge openings 7. Since the washing liquid and gas are introduced alternately, the apparent viscous resistance of the washing liquid is reduced due to the existence of the gas, thereby increasing the flow speed of the washing liquid to enhance the cleaning effect. After the cleaning operation for a predetermined time is finished, the change valve 46 is switched toward the supply line 48 for the pure water supply source by the change valve drive device 57, so that the discharge element 10 is washed by the pure water to remove the washing liquid in the discharge element 10. Thereafter, the change valve 46 is switched toward the supply line 49 for the gas supply source by the change valve drive device 57, so that only gas is introduced into the discharge element 10 to dry the interior of the discharge element 10.

The washing liquid may be neutral detergent solution, and alkali solution or acetone may be used to remove the remnants of positive photoresist. Alternatively, the washing liquid supply source 50, 53 may be omitted and the discharge element may be washed or cleaned using only pure water. The drying gas may be air, oxygen, nitrogen, argon or the like.

Now, the test result regarding this embodiment will be described. The discharge element 10 to be cleaned was a discharge element wherein the cutting operation for forming the discharge openings was effected in the conventional manner and wherein swarf adhered to the ink passages 6 and the liquid chamber 8. In this discharge element, conventionally, the swarf was not removed by a cleaning operation using only pure water, even when the cleaning time was lengthened indefinitely. Now, in this embodiment, (not using the special washing liquid, but) the pure water and nitrogen gas were introduced into the discharge element 10 alternately at a time interval of 0.5 second. In this case, the pressures of the pure water and nitrogen gas were 4 $kg/cm^2$, respectively. As a result, it was found that the swarf could be removed completely by the cleaning operation after about 3 minutes. Further, when the washing liquid supply source 50, 53 was provided and neutral detergent solution was used as washing liquid in place of the pure water, the cleaning time could be further reduced, but the washing or rinsing operation by pure water was required after the cleaning operation. When air was used in place of the nitrogen gas, the same effect could be obtained.

Regarding a discharge element 10 wherein the remnants of positive photoresist remains in the ink passages 6, the same test was conducted. When the washing liquid such as organic alkali solution or acetone and gas were introduced into the discharge element 10 alternately to clean the latter, it was found that the remnants could be removed effectively as in the above test. Incidentally, in this case, rinsing by pure water was required.

Next, a seventh embodiment of the present invention will be explained. When the washing operation in the sixth embodiment is effected regarding a number of discharge elements 10 at a time, it is feared that the pressures applied to the respective discharge elements 10 differ from each other due to the difference in lengths of the piping to the respective discharge elements, with the result that the cleaning effects for the respective discharge elements differ from each other. Thus, in the seventh embodiment, the dispersion in the cleaning effects is eliminated by performing vacuum suction from the discharge openings 7.

Figure 9:
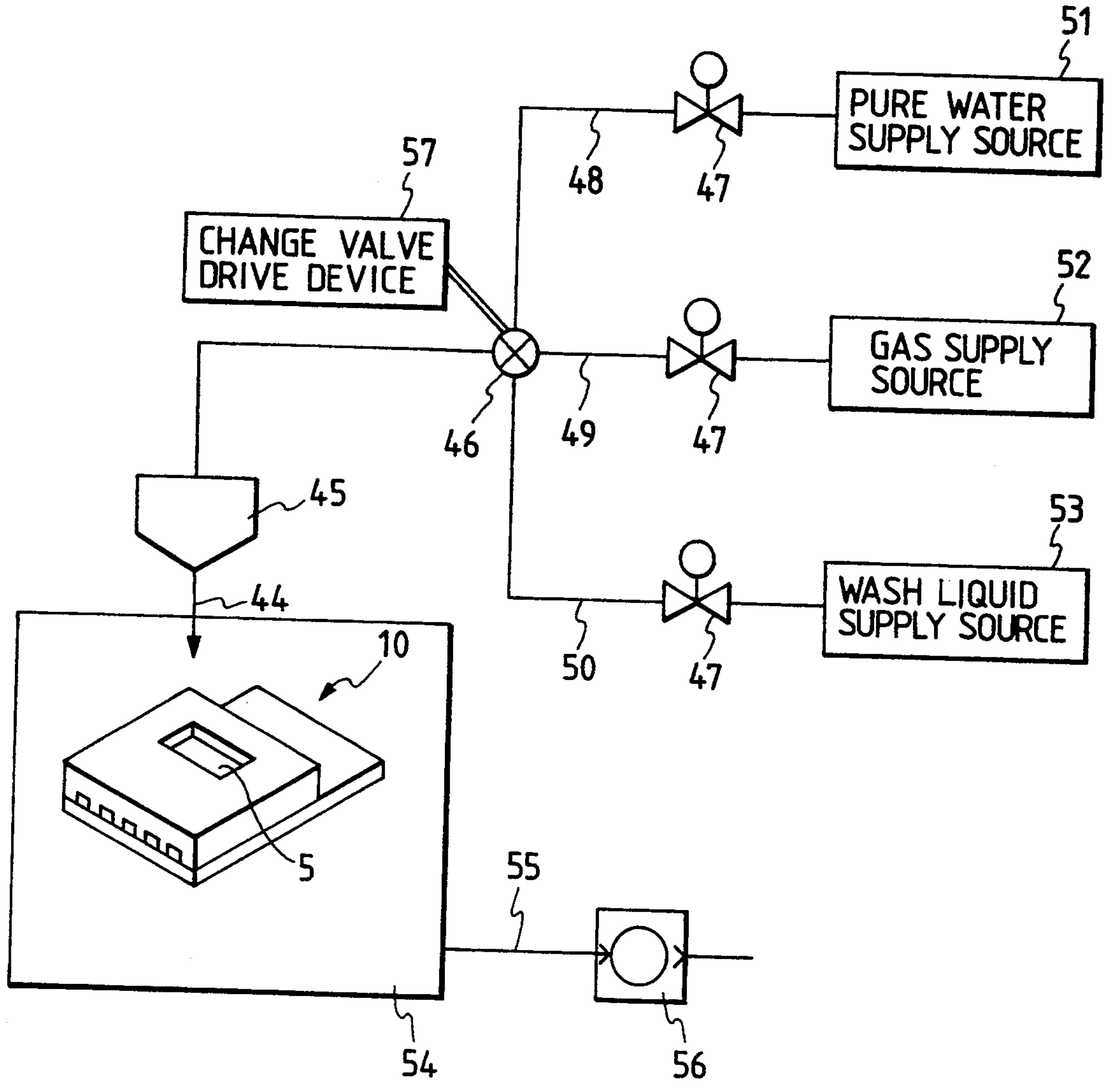
FIG. 9 is a piping circuit according to a seventh embodiment of the present invention.

FIG. 9 shows a piping circuit according to the seventh embodiment. The difference between the fourth embodiment and the fifth embodiment is applied to the difference between the sixth embodiment and this seventh embodiment as it is. When the pressures in the supply lines 48 to 50 were regulated to 1 to 2 $kg/cm^2$ by the respective pressure regulators 47 and the vacuum was established in the vacuum chamber 54 (the other conditions were the same as those in the sixth embodiment), even if a large number of discharge elements were cleaned simultaneously, it was found that there was no dispersion in the cleaning effects of the discharge elements 10.

Figure 10:
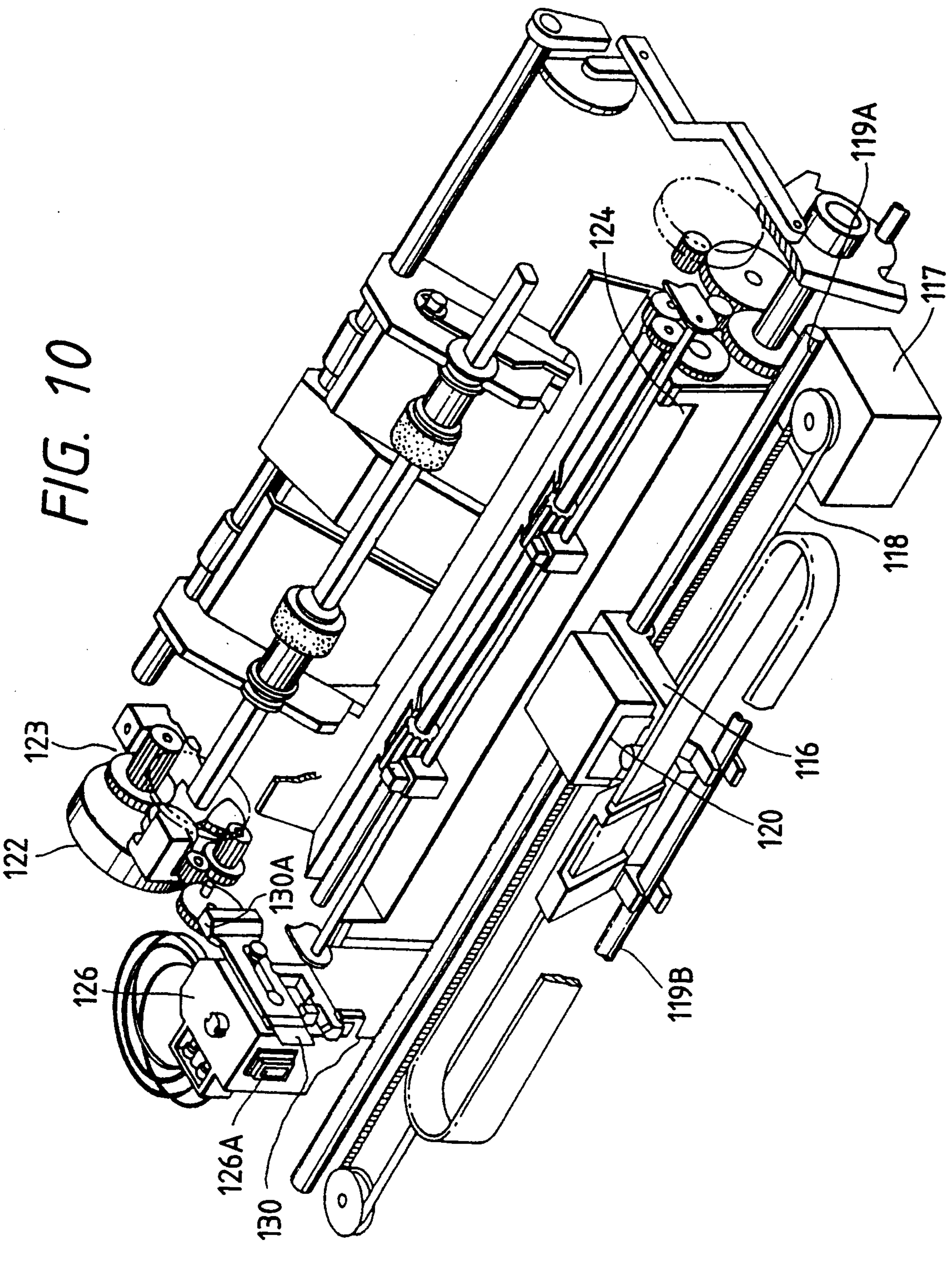
FIG. 10 is a perspective view of a main portion of an ink jet recording apparatus having an ink jet recording head according to the present invention.

Next, an ink jet recording apparatus having an ink jet recording head manufactured by the ink jet recording head manufacturing method according to the present invention will be explained with reference to FIG. 10. FIG. 10 is a perspective view of a main portion of an ink jet recording apparatus (IJRA) on which the recording head obtained by the present invention is mounted as an ink jet head cartridge (IJC).

In FIG. 10, an ink jet head cartridge 120 having a group of nozzles (discharge openings) for discharging ink toward a recording surface of a recording sheet fed onto a platen 124 is held by a carriage 116 which is reciprocally shifted along two parallel guide shafts 119A, 119B within a whole width of the recording sheet by a drive motor 117 via a drive belt 118 connected to the carriage and adapted to transmit a driving force from the drive motor to the carriage.

A head recovery device 126 is arranged to oppose to one end of a carriage shifting path, for example, a home position. The head recovery device 126 is driven by a driving force of a motor 122 via a transmission mechanism 123 to cap the ink jet head cartridge 120. When the ink jet head cartridge 120 is capped by a cap 126A of the recovery device 126, ink absorption is effected by an appropriate absorbing means provided in the head recovery device 126 or the ink supply is forcibly effected by an appropriate pressurizing means provided in an ink supply path to the ink jet head cartridge 120, with the result that the ink is forcibly discharged from the discharge openings to remove the viscous ink in the nozzles, thereby performing the discharge recovery treatment. Further, when the recording operation is finished, the ink jet head cartridge 120 is protected with capping it by the cap portion.

A blade 130 made of silicone rubber is arranged at a side of the head recovery device 120 and serves as a wiping member. The blade 130 is cantilevered by a blade holder 130A and is also driven by the motor 122 and the transmission mechanism 123 to be engaged by the discharge opening surface of the ink jet head cartridge 120. With this arrangement, at a proper timing in the recording operation of the ink jet head cartridge 120 or after the discharge recovery treatment by the head recovery device 126 is finished, the blade 130 is extended in a shifting path of the ink jet head cartridge 120, thereby wiping the water droplets, moisture and dirt adhered to the discharge opening surface of the ink jet head cartridge 120 during the shifting movement of the ink jet head cartridge 120.

According to the present invention, an excellent effect can be obtained in a recording head and a recording apparatus of ink jet recording type wherein an ink droplet is formed by employing thermal energy to perform the recording, among the ink jet recording apparatuses. It is preferable to employ the typical structure and the principle of structures disclosed in, for example, U.S. Pat. Nos. 4,723,129 and 4,740,796. This recording system can be used in both the so-called "On-Demand" type and "Continuous" type.

Briefly explaining this recording system, an electro-thermal conversion element disposed to align to a sheet or a liquid passage in which liquid (ink) is held is supplied with at least one drive signal which corresponds to information to be recorded and which enables the temperature of the electro-thermal conversion element to be raised higher than a nucleate boiling point, so that thermal energy is generated in the electro-thermal conversion element and film boiling is caused to take place on the surface of the recording element which is heated. As a result, bubbles can be respectively formed in liquid (ink) in response to the drive signals. Due to the enlargement and contraction of the bubble, liquid (ink) is discharged through the discharge opening, so that at least one droplet is formed. In a case where the aforesaid drive signal is made to be a pulse signal, a further satisfactory effect can be obtained in that the bubble can immediately and properly be expanded/contracted and liquid (ink) can be discharged while exhibiting excellent responsiveness. It is preferable to employ a drive signal of the pulse signal type disclosed in U.S. Pat. Nos. 4,463,359 and 4,345,262. Furthermore, in the case where conditions for determining the temperature rise ratio on the aforesaid heated surface disclosed in U.S. Pat. No. 4,313,124 are adopted, a further excellent recording operation can be performed.

In addition to the structure (a linear liquid passage or a perpendicular liquid passage) of the recording head formed by combining the discharge ports, the liquid passage and the electro-thermal conversion members disclosed in the aforesaid specifications, a structure disclosed in U.S. Pat. Nos. 4,558,333 and 4,459,600 in which the heated portion is disposed in a bent portion is included in the scope of the present invention. Furthermore, the present invention can effectively be embodied in a structure in which a common slit is made to be the discharge portion of a plurality of electro-thermal conversion members and which is disclosed in the Japanese Patent Laid-open No. 59-123670 and a structure in which an opening for absorbing thermal pressure wave is formed to align to the discharge opening and which is disclosed in the Japanese Patent Laid-open No. 59-138461.

The present invention is also effectively applicable to a full line type recording head having a length which corresponds to the width of the maximum recording medium which can be recorded by the recording apparatus. Such a recording head of the full line type may be a structure capable of realizing the aforesaid length and can be formed by combining a plurality of recording heads disclosed in the aforesaid patent specifications or a structure formed by a integrally formed recording head. In addition, the present invention can also be adapted to a structure having an interchangeable chip type recording head which can be electrically connected to the body of the apparatus or to which ink can be supplied from the body of the apparatus when it is mounted on the body of the apparatus, or a cartridge type recording head integrally formed with the recording head.

Further, it is preferable to also provide recording head recovery means and an auxiliary means of the recording apparatus according to the present invention because the effect of the present invention can further be stabilized. Specifically, an effect can be obtained in that the recording operation can be stably performed by providing a recording head capping means, a cleaning means, a pressurizing or sucking means, an electro-thermal conversion element or other heating device or an auxiliary heating means formed by combining the aforesaid elements, and a means for performing a preliminary discharge mode wherein a discharge is performed independently from the recording operation.

Furthermore, regarding the recording mode of the recording apparatus, not only a recording mode for recording only a main color such as black may be used, but also a structure may be formed by integrally forming recording heads or by combining a plurality of recording heads. The present invention can significantly effectively be adapted to an apparatus having a recording head of a plurality of colors or at least one full color head arranged to mix colors.

Further, although the above-mentioned embodiments of the present invention use liquid ink, ink which solid at room temperature or ink which is softened at room temperature can be used. In the aforementioned ink jet apparatus, the temperature of ink is usually controlled in a range from 30° C. to 70° C. to make the viscosity of ink to be in a stable discharge range and thereby ink which is liquefied in response to a record signal supplied may be used.

Furthermore, the temperature increase of ink can be prevented by positively using the temperature rise due to the thermal energy as energy of state change from the solid state to the liquid state of ink or ink which is solidified when it is allowed to stand in order to prevent the evaporation of ink may be used. That is, ink which is liquefied by thermal energy such as that supplied in response to the record signal and which is discharged as ink droplet or ink which is solidified when it reaches the recording medium can be employed in the present invention. In this case, ink may be, in the form of liquid or solid, held by a recess of a porous sheet or a through hole as disclosed in the Japanese Patent Laid-open Nos. 54-56847 and 60-71260 and disposed to confront the electro-thermal conversion element.

In the present invention, it is most preferable that ink be discharged by the aforementioned film boiling method.

As mentioned above, in an ink jet recording head manufacturing method according to an aspect of the present invention, the ink passages are filled with fluid in be maintained to the pressurized condition during the cutting operation for forming discharge openings. As a result, it is possible to prevent the cutting liquid including the swarf from entering into the ink passages from the discharge openings when the discharge openings are opened by the cutting operation, thus providing an ink jet recording head with high quality. In this case, when the liquid including abrasives is used as the aforesaid fluid, the discharge opening forming surface is polished by the abrasives, thus providing an ink jet recording head with higher quality.

Further, in an ink jet recording head manufacturing method according to another aspect of the present invention, after the discharge element is formed, the interior of the discharge element is cleaned by introducing the liquid overlapped by the sound wave into the discharge element from the ink supply port. As a result, the cleaning effect by the liquid is increased to wash the discharge element more effectively, thus providing an ink jet recording head with high quality.

Further, in an ink jet recording head manufacturing method according to a further aspect of the present invention, after the discharge element is formed, the interior of the discharge element is cleaned by introducing gas and liquid into the discharge element alternately. As a result, it is possible to substantially increase the flowing speed of the liquid or washing liquid to thereby clean the discharge element more effectively, thus providing an ink jet recording head with high quality.

What is claimed is:

1. A method for manufacturing an ink jet head including a process for forming a plurality of discharge openings by cutting a plate-like construction comprising a substrate on which a plurality of energy generating elements for generating energy for discharging an ink are formed, an ink path for discharging the ink corresponding to said energy generating elements on said substrate, a liquid chamber communicating with said ink path, and a member having an ink supply port for supplying the ink into said liquid chamber, said cutting taking place at a position where said discharge openings for discharging the ink are to be formed, characterized by the steps of filling said ink path and said liquid chamber with a liquid and maintaining said liquid at a pressure which is higher than an atmospheric pressure at least during said cutting step for forming said discharge openings.

2. An ink jet head manufacturing method according to claim 1, wherein said ink path is maintained to the pressurized condition by supplying the liquid to said ink path from an ink supply port of said head.

3. An ink jet head manufacturing method according to claim 2, wherein a nozzle is disposed at a position spaced apart from said ink supply port, and wherein the liquid; and is supplied to said ink path from said ink supply port by discharging the liquid from said nozzle.

4. An ink jet head manufacturing method according to claim 2, wherein a nozzle is disposed contiguous to said ink supply port, and wherein the liquid is supplied to said ink path from said ink supply port by discharging the liquid said nozzle.

5. An ink jet head manufacturing method according to claim 1, wherein said liquid comprises abrasives therein.

6. An ink jet head manufacturing method according to claim 1, wherein a substrate on which an energy generating body for generating energy employed to discharge ink is used.

7. An ink jet head manufacturing method according to claim 1, wherein said ink passage is cleaned by introducing liquid and gas into said ink path alternately.

8. An ink jet head manufacturing method according to claim 7, wherein an ink jet head is provided with an electro-thermal converter for generating thermal energy, as an energy generating body for generating energy employed to discharge ink from said discharge opening.

9. An ink jet head manufacturing method according to claim 7, wherein an ink jet head is provided with a piezo-electric element as an energy generating body for generating energy employed to discharge ink from said discharge opening.

10. An ink jet head manufacturing method according to claim 7, wherein an ink jet head is of a full line type in which a plurality of discharge openings are provided along a whole width of a recordable area of a recording medium.

11. An ink jet head manufacturing method according to claim 7, wherein an ink jet head is to be used with an ink jet apparatus having at least a member for holding said ink jet head.

12. A method for manufacturing an ink jet head including a process for forming a plurality of discharge openings by cutting a plate-like construction comprising a substrate on which a plurality of energy generating elements for generating energy for discharging a ink are formed, an ink path for discharging the ink corresponding to said energy generating elements on said substrate, a liquid chamber communicating with said ink path, and a member having an ink supply port for supplying the ink into said liquid chamber, said cutting taking place at a position where said discharge openings for discharging the ink are to be formed, and washing said ink path and said liquid chamber after said discharge opening is formed by said cutting, wherein the washing comprises the step of introducing under pressure a liquid superimposed with a sound wave in a direction from said ink supply port toward said ink discharge openings.

13. An ink jet head manufacturing method according to claim 12, wherein the liquid overlapped by said sound wave is introduced into said ink path while being pressurized.

14. An ink jet head manufacturing method according to claim 12, wherein pure water is used as the liquid in a final stage of said washing step.

15. An ink jet head manufacturing method according to claim 12, wherein said liquid is selected from pure water, detergent solution, alkari solution or acetone.

16. An ink jet head manufacturing method according to claim 12, wherein said ink path is washed while performing vacuum suction in said ink passage from said discharge opening.

17. An ink jet head manufacturing method according to claim 12, wherein a substrate on which an energy generating body for generating energy employed to discharge ink is used.

18. An ink jet head manufacturing method according to claim 12, further comprising a step of forming said discharge opening by performing a cutting operation along a portion where said discharge opening is to be formed, while maintaining said ink path to a pressurized condition by filling said ink path with liquid.

19. An ink jet head manufacturing method according to claim 12, wherein said ink path is washed by introducing liquid and gas into said ink path alternately.

20. An ink jet head manufacturing method according to claim 19, wherein an ink jet head is provided with an electro-thermal converter for generating thermal energy, as an energy generating body for generating energy employed to discharge ink from said discharge opening.

21. An ink jet head manufacturing method according to claim 19, wherein an ink jet head is provided with a piezo-electric element as an energy generating body for generating energy employed to discharge ink from said discharge opening.

22. An ink jet head manufacturing method according to claim 19, wherein an ink jet head is of a full line type in which a plurality of discharge openings are provided along a whole width of a recordable area of a recording medium.

23. An ink jet head manufacturing method according to claim 19, wherein an ink jet head is to be used with an ink jet apparatus having at least a member for holding said ink jet head.

24. A method for manufacturing an ink jet head including a process for forming a plurality of discharge openings by cutting a plate-like construction comprising a substrate on which plural energy generating elements for generating energy for discharging an ink are formed, an ink path for discharging the ink corresponding to said energy generating elements on said substrate, a liquid chamber, communicating with said ink path, and a member having an ink supply port for supplying the ink into said liquid chamber said cutting occurring at a position where said discharge openings for discharging the ink are to be formed, and washing said ink path and said liquid chamber after said discharge openings are formed by said cutting, wherein the washing comprises the step of generating in alternation a liquid flow and a gas flow in a direction from said ink supply port toward said discharge openings.

25. An ink jet head manufacturing method according to claim 24, wherein liquid and gas are introduced into said ink path while being pressurized.

26. An ink jet head manufacturing method according to claim 24, wherein pure water is used as said liquid in a final stage of said washing step.

27. An ink jet head manufacturing method according to claim 24, wherein said gas is selected from nitrogen, oxigen, air or argon.

28. An ink jet head manufacturing method according to claim 24, wherein said liquid is selected from pure water, detergent solution, alkari solution or acetone.

29. An ink jet head manufacturing method according to claim 24, wherein said ink path is washed while performing vacuum suction in said ink path from said discharge opening.

30. An ink jet head manufacturing method according to claim 29, wherein a substrate on which an energy generating body for generating energy employed to discharge ink is used.

31. An ink jet head manufacturing method according to claim 29, further comprising a step of forming said discharge opening by performing a cutting operation along a portion where said discharge opening is to be formed, while maintaining said ink path to a pressurized condition by filling said ink path with liquid.

32. An ink jet head manufacturing method according to claim 29, further comprising a step of cleaning said ink path by introducing liquid overlapped by a sound wave into said ink path.

33. A manufacturing method according to claim 24, wherein said flow of the liquid and gas is generated by introducing the liquid and gas under pressure.

34. A manufacturing method according to claim 24, wherein said flow of the liquid and gas is generated by vacuum sucking the liquid and gas from said discharge opening.

* * * * *

UNITED STATES PATENT AND TRADEMARK OFFICE

CERTIFICATE OF CORRECTION

PATENT NO. : 5,347,713

DATED : September 20, 1994

INVENTOR(S) : MAKOTO SHIBATA, ET AL.

It is certified that error appears in the above-indentified patent and that said Letters Patent is hereby corrected as shown below:

ON TITLE PAGE

In [56] References Cited, under FOREIGN PATENT DOCUMENTS:
"3251244 10/1988 Japan" should read
--63-251244 10/1988 Japan--.

COLUMN 1

Line 49, "opening" should read --openings--.

COLUMN 2

Line 20, "accumulated" should read --accumulate--.
Line 30, "the use" should read --use--.
Line 31, "ink" should read --the ink--.
Line 56, "provided" should read --provide--.
Line 66, "to" should read --in--.

COLUMN 3

Line 24, "an extent" should read --such--.

COLUMN 6

Line 35, "chucked" should read --chucked (held)--.
Line 44, "34" should be deleted.

COLUMN 7

Line 33, "moved," should read --removed,--.
Line 57, "in" should read --to--.

UNITED STATES PATENT AND TRADEMARK OFFICE

CERTIFICATE OF CORRECTION

PATENT NO. : 5,347,713

DATED : September 20, 1994

INVENTOR(S) : MAKOTO SHIBATA, ET AL.

It is certified that error appears in the above-indentified patent and that said Letters Patent is hereby corrected as shown below:

COLUMN 7

Line 58, "to the" should read --in the--.
Line 62, "escapes." should read --escapes--.

COLUMN 8

Line 31, "the" should be deleted.

COLUMN 9

Line 24, "After," should read --After--.
Line 30, "remnents" should read --remnants--.
Line 67, "a" should read --an--.

COLUMN 10

Line 18, "was" should read --were--.

COLUMN 11

Line 28, "remains" should read --remain--.

COLUMN 12

Line 18, "device 126" should read --device 126,--.
Line 28, "device 120" should read --device 126--.

COLUMN 13

Line 35, "a" (second occurrence) should read --an--.
Line 67, "solid" should read --is solid--.

UNITED STATES PATENT AND TRADEMARK OFFICE

CERTIFICATE OF CORRECTION

PATENT NO. : 5,347,713

DATED : September 20, 1994

INVENTOR(S) : MAKOTO SHIBATA, ET AL.

It is certified that error appears in the above-indentified patent and that said Letters Patent is hereby corrected as shown below:

COLUMN 14

Line 28, "in" should read --to-- and "to" should read --in--.

COLUMN 15

Line 9, "to the" should read --in a--.
Line 15, "liquid; and" should read --liquid--.
Line 21, "liquid" should read --liquid from--.
Line 30, "passage" should read --path--.
Line 57, "a" should read --an--.

COLUMN 16

Line 12, "alkari" should read --alkali--.
Line 15, "passage" should read --path--.
Line 25, "to" should read --in--.
Line 58, "chamber," should read --chamber--.
Line 60, "chamber" should read --chamber,--.

COLUMN 17

Line 10, "oxigen," should read --oxygen,--.
Line 13, "alkari" should read --alkali--.

UNITED STATES PATENT AND TRADEMARK OFFICE
CERTIFICATE OF CORRECTION

PATENT NO. : 5,347,713
DATED : September 20, 1994
INVENTOR(S) : MAKOTO SHIBATA, ET AL.

It is certified that error appears in the above-indentified patent and that said Letters Patent is hereby corrected as shown below:

COLUMN 18

Line 7, "to" should read --in--.
Line 19, "opening." should read --openings.--.

Signed and Sealed this

Twenty-first Day of February, 1995

Attest:

BRUCE LEHMAN

*Attesting Officer* *Commissioner of Patents and Trademarks*